US011725167B2

(12) United States Patent
Grone et al.

(10) Patent No.: US 11,725,167 B2
(45) Date of Patent: Aug. 15, 2023

(54) BREWING ARRANGEMENT AND METHOD

(71) Applicant: Limestone Coast Brewing Company Pty Ltd, Hillarys (AU)

(72) Inventors: Sven George Grone, Hillarys (AU); Geoffrey Ross Munday, Hillarys (AU)

(73) Assignee: Limestone Coast Brewing Company Pty Ltd, Hillarys (AU)

( * ) Notice: Subject to any disclaimer, the term of this patent is extended or adjusted under 35 U.S.C. 154(b) by 967 days.

(21) Appl. No.: 16/607,345

(22) PCT Filed: Apr. 20, 2018

(86) PCT No.: PCT/AU2018/050365

§ 371 (c)(1),
(2) Date: Oct. 22, 2019

(87) PCT Pub. No.: WO2018/195589

PCT Pub. Date: Nov. 1, 2018

(65) Prior Publication Data

US 2020/0385656 A1 Dec. 10, 2020

(30) Foreign Application Priority Data

Apr. 28, 2017 (AU) ................................ 2017901538

(51) Int. Cl.

*C12C 13/10* (2006.01)
*C12C 7/165* (2006.01)

(Continued)

(52) U.S. Cl.

CPC .............. *C12C 13/10* (2013.01); *C12C 7/165* (2013.01); *C12C 7/26* (2013.01); *C12C 11/006* (2013.01)

(58) Field of Classification Search

CPC ..... C12C 11/00; C12C 11/003; C12C 11/006; C12C 13/00; C12C 13/02; C12C 13/10;

(Continued)

(56) References Cited

U.S. PATENT DOCUMENTS

2003/0224088 A1 12/2003 Burdick
2012/0251661 A1* 10/2012 Toombs ................. C12C 13/10 99/276

(Continued)

OTHER PUBLICATIONS

International Search Report; for patent application No. PCT/AU2018/050365; authorized officer Giuseppe Zagari; Jul. 10, 2018; 4 pages.

*Primary Examiner* — Dana Ross
*Assistant Examiner* — Joseph W Iskra
(74) *Attorney, Agent, or Firm* — Winstead PC

(57) ABSTRACT

Provided is a brewing system (10) comprising a brewhouse assembly (12) having a mash tun (14), a kettle (16), a filter (18) and wort chiller (20) arranged in fluid communication for brewing purposes. The brewhouse assembly (12) is configured to operatively produce wort from mash liquor. Wort produced by the brewhouse assembly (12) is generally stored in a transport container (22). The brewing system 10 further includes a plurality of fermentation assemblies (24) each arranged remotely from the brewhouse assembly (12). Each fermentation assembly (24) includes at least one fermenter (26) which is arranged in fluid communication with a plurality of bright beer tanks (28). Each fermenter (26) is operatively suppliable with wort from the transport container (22) and is configured to produce beer from the wort for subsequent storage in a bright beer tank (28). The brewing system (10) also includes a monitoring and control system (30) which comprises a plurality of sensors (32) for sensing brewhouse and fermentation assembly operating characteristics, a plurality of actuators (34) configured to remotely control the brewhouse and fermentation assem- (Continued)

blies (12) and (24) to influence these respective operating characteristics, and some manner of remote interface (100) for receiving the sensed operating characteristics and instructing the actuators (34).

12 Claims, 4 Drawing Sheets

(51) Int. Cl.
*C12C 7/26* (2006.01)
*C12C 11/00* (2006.01)

(58) Field of Classification Search
CPC .. C12C 7/00; C12C 7/165; C12C 7/26; G05B 19/0428; G06Q 50/04; Y02P 90/30
USPC .......................................................... 99/276
See application file for complete search history.

(56) References Cited

U.S. PATENT DOCUMENTS

2013/0220133 A1 8/2013 Plutshack
2013/0314244 A1* 11/2013 Hershberger ........ B67D 1/0888 340/870.02
2014/0017354 A1* 1/2014 Joseph ..................... C12C 7/04 99/278
2014/0234482 A1 8/2014 Kempfert
2014/0287092 A1 9/2014 Block et al.
2015/0000531 A1 1/2015 Mitchell et al.
2015/0329808 A1 11/2015 Ramsey
2016/0272927 A1 9/2016 Mitchell
2017/0029752 A1 2/2017 Mitchell et al.

* cited by examiner

BREWING ARRANGEMENT AND METHOD

TECHNICAL FIELD

This invention relates to the field of brewing, in general, and more particularly to a brewing arrangement and an associated brewing method.

BACKGROUND ART

The following discussion of the background art is intended to facilitate an understanding of the present invention only. The discussion is not an acknowledgement or admission that any of the material referred to is or was part of the common general knowledge as at the priority date of the application.

A microbrewery or craft brewery is generally a brewery that produces small amounts of beer, typically much smaller than large-scale corporate breweries, and is independently owned. A typical approach for such breweries to distinguish their brews from large-scale and large-volume corporate breweries is to emphasise quality, flavour and brewing technique.

Despite interest and demand for craft brewing, there are a number of problems in developing a craft or microbrewery. One problem is finding sufficient capital to purchase and install the necessary equipment, as well as dealing with any technical, logistical or supply-chain issues inherent to operating and running such equipment.

Further hurdles to establishing a craft brewery are licensing and regulatory issues, including taxation and relevant liquor laws, as well as learning the necessary brewing skills or finding a qualified brewer to manage such a brewery.

The present invention was conceived with these shortcomings in mind and seeks to propose possible solutions, at least in part, in amelioration of the known shortcomings in the art of craft or microbrewing.

SUMMARY OF THE INVENTION

According to a first aspect of the invention there is provided a brewing arrangement comprising:

a brewhouse assembly having a mash tun, a kettle and a wort chiller arranged in fluid communication, said brewhouse assembly configured to operatively produce wort from mash liquor, said wort storable in a transport container;

a plurality of fermentation assemblies arranged remotely from the brewhouse assembly in at least one hospitality establishment having a geographic distance of at least 1 km from the brewhouse assembly, in use, each fermentation assembly including at least one fermenter arranged in fluid communication with a plurality of bright beer tanks, said fermenter suppliable with wort from the transport container and configured to operatively produce beer for subsequent storage in a bright beer tank; and a monitoring and control system comprising i) a plurality of sensors for sensing brewhouse and fermentation assembly operating characteristics, ii) a plurality of actuators configured to remotely control the brewhouse and fermentation assemblies to influence such operating characteristics, and iii) a remote interface for receiving sensed operating characteristics and instructing the actuators, whereby centralised wort production and distributed beer production at a plurality of hospitality establishments are remotely monitorable and controllable via the remote interface.

It is to be appreciated that fermentation occurs remotely from the brewhouse at the fermentation assemblies in the hospitality establishment(s). Accordingly, the skilled addressee will appreciate that no production of alcohol is generally performed by the brewhouse, which typically does not require a liquor license for the production of alcohol.

In one example, the brewhouse assembly comprises at least one filter. The filter may form part of the mash tun, where a grain bed acts as an operative filter element. In one example, the filter comprises a hopback or a whirlpool.

In one example, the wort chiller comprises a heat exchanger.

Typically, the brewhouse assembly comprises hot liquor tanks for storing hot liquor during wort production.

Preferably, each fermentation assembly is arranged remotely from the brewhouse assembly by being installed at a hospitality establishment such as a restaurant, sporting club, pub, craft brewery, brewpub or similar beer retail and/or hospitality establishment. The hospitality establishment is typically more than 1 km remote from the brewhouse assembly, but may be up to a 1000 kms distant, or even more.

Typically, the sensors of the monitoring and control system comprises sensors for sensing brewhouse and fermentation assembly operating characteristics selected from a list consisting of fluid pressure, fluid temperature, fluid flow rate, and fluid density.

Accordingly, the actuators of the monitoring and control system comprise actuators for controlling brewhouse and fermentation assembly operating characteristics selected from a list consisting of fluid pressure, fluid temperature, fluid flow rate, and fluid density.

Typically, the actuators comprise pumps, heating elements, and valves.

Typically, the remote interface comprises a processing system arranged in signal communication with the brewhouse and fermentation assemblies by means of a communications network or system.

In an embodiment, the remote interface is configured to operatively provide a Graphical User Interface (GUI) for remote display by the processing system, said GUI configured to provide a dashboard representing the brewhouse and fermentation assembly operating characteristics.

Typically, the GUI dashboard provides an iconographical and interactive representation of the brewhouse and fermentation assembly operating characteristics.

Typically, the GUI provides an iconographical and interactive representation of a plurality of hospitality establishments with fermentation assemblies.

Typically, the brewing arrangement includes a mobile filtration and transfer rig operatively and selectively dispatchable to a fermentation assembly, and which is configured to filter and transfer beer from a fermenter to a bright beer tank, said filtration and transfer rig remotely monitorable and controllable by the monitoring and control system.

Typically, the mobile filtration and transfer rig comprises a pressurised filter housing and body, a transfer pump controlled by a variable speed drive, a calibrated magnetic flowmeter and calibrated temperature elements, wherein the speed of the transfer pump is adjustable via the variable speed drive to ensure optimum flow through the filter assembly during beer transfer.

According to a second aspect of the invention there is provided a brewing method comprising the steps of:

producing wort from mash liquor by means of a brewhouse assembly;

storing said wort in a transport container shippable to at least one hospitality establishment having a geographic distance of at least 1 km from the brewhouse assembly;

supplying shipped wort produced by said brewhouse assembly to a fermentation assembly installed at the hospitality establishment, said fermentation assembly configured to operatively produce beer for subsequent storage in a bright beer tank; and continuously monitoring and controlling the respective production of wort and beer by means of a monitoring and control system having a plurality of sensors and actuators for sensing and controlling brewhouse and fermentation assembly operating characteristics, as well as a remote interface enabling a remote brewer to receive sensed operating characteristics and to instruct the actuators to influence such operating characteristics, whereby centralised wort production and distributed beer production at a plurality of hospitality establishments are remotely monitorable and controllable via the remote interface.

In one example, the step of producing wort includes preparing water and mixing same with grain in a mash tun where enzymes react with starch in the grain to produce dissolved malt in the water or mash liquor, the grain having a coarse grind to facilitate the mash tun using a process of mash fluidisation to enable transfer of mass and heat.

In one example, the step of producing wort includes recirculating the mash liquor through a grain bed formed in the mash tun whilst pumping said liquor through external heaters for temperature control.

Typically, the external heaters are configured to maintain the temperature in the mash tun and also provide heat when the liquor temperature is ramped to a different temperature in order to enable different enzymes to produce a different malt profile from the grain.

In one example, at the time of temperature ramp, water at near boiling temperature is introduced to the recirculating mash liquor to enable quick temperature ramp steps.

Preferably, the step of producing wort includes enabling a mash stirrer three times during mash production, namely shortly after the mash is struck, shortly after a main mash rest begins, and midway through the main mash rest, so that the grain bed is mixed to prevent the formation of dough balls but not disturbed to the point of causing pulverisation leading to a stuck mash.

In one example, the step of producing wort includes transferring the sweet wort from the mash tun to a kettle under variable speed control to ensure optimum transfer rates to maximise grain bed extraction efficiency.

Typically, the step of transferring the wort from the mash tun to the kettle includes sparging water at 78° C. to a top of the grain bed to wash out the liquefied malt from the grain bed, said step of managing any addition of spare water and the transfer to the kettle managed by mass balance calculations to ensure precise control to optimum conditions.

In one example, the method includes the step of, once the mash transfer is complete, emptying and automatically cleaning the mash tun in preparation for another charge of grain for another batch of wort.

In one example, the step of producing wort includes controlling heat input to the kettle to achieve a 5%-15% boil-off whilst hops are added. Typically, heat input to the kettle is controlled to achieve a 10% boil-off.

In one example, the step of storing the wort includes transferring said wort to the transport container via a heat exchanger and hop back whilst controlling a transfer rate thereof to ensure a constant temperature is maintained in the transport container.

In one example, the method may include the step of shipping the transport container to the hospitality establishment or remote location. Alternatively, the transport container may be shipped to the hospitality establishment or remote location by a third party.

In one example, the method includes the step of adding yeast to the wort in the fermentation assembly. In another example, the method includes the step of adding yeast to the wort in the transport container.

Typically, the step of monitoring and controlling the production of beer includes monitoring and controlling temperature and pressure in the fermentation assembly over a period of days while the yeasted wort converts into beer.

In one example, the step of monitoring and controlling the production of beer includes, once the required fermentation is determined complete, initiating a chill process where the contents of a fermenter of the fermentation assembly is brought to 0° C. and maintained for some days.

Typically, the method includes the step of, at the end of the chill period, dispatching a mobile filtration rig to the hospitality establishment or remote location whereby the beer is transferred and filtered from the fermenter into a bright beer tank of the fermentation assembly.

In a further example, the method includes the step of, once the beer is transferred from the fermenter, connecting the fermenter to a mobile cleaning rig configured to clean the fermenter with caustic and/or sanitising solutions before pumping waste into a separate tank.

BRIEF DESCRIPTION OF THE DRAWINGS

The description will be made with reference to the accompanying drawings in which.

DETAILED DESCRIPTION OF EMBODIMENTS

Figure 1:
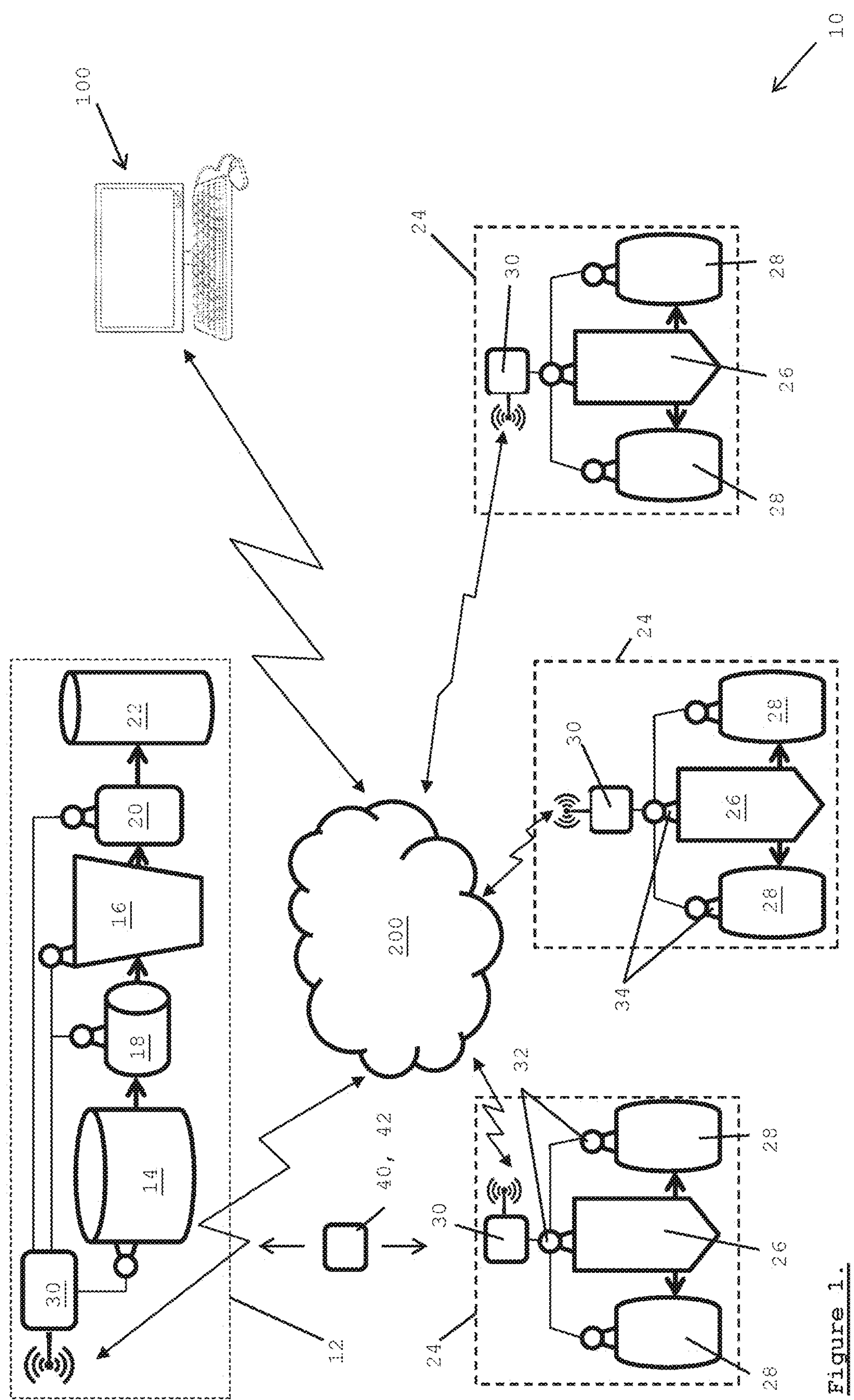
FIG. 1 is a diagrammatic representation of one example of a brewing arrangement, in accordance with an aspect of the invention.

Further features of the present invention are more fully described in the following description of several non-limiting embodiments thereof. This description is included solely for the purposes of exemplifying the present invention to the skilled addressee. It should not be understood as a restriction on the broad summary, disclosure or description of the invention as set out above. In the figures, incorporated to illustrate features of the example embodiment or embodiments, like reference numerals are used to identify like parts throughout.

With reference now to FIG. 1, there is broadly shown one example of a brewing arrangement 10, in accordance with an aspect of the invention. In general, the brewing arrangement 10 comprises a brewhouse assembly 12 typically having a mash tun 14, a kettle 16, a filter 18 and wort chiller 20 arranged in fluid communication for brewing purposes, as will be understood by the skilled addressee.

The brewhouse assembly 12 is configured to operatively produce wort from mash liquor, as will be described in more detail below. It is further to be appreciated that the brewhouse assembly 12 may include additional components for facilitating wort production, such as hot liquor tanks (not shown), or the like. At the end of a brewing process, an example of which is provided below, wort produced by the brewhouse assembly 12 is generally stored in a transport container 22.

The brewing arrangement 10 further includes a plurality of fermentation assemblies 24, each arranged remotely from the brewhouse assembly 12, as shown. Each fermentation assembly is typically arranged remotely from the brewhouse assembly 12 by being installed at some manner of hospitality and/or beer retail establishment, such as a craft brewery, a brewpub, or the like.

Each of the fermentation assemblies includes at least one fermenter 26 which is arranged in fluid communication with a plurality of bright beer tanks 28, as shown. Each fermenter 24 is operatively suppliable with wort from the transport container 22, as produced by the brewhouse assembly 12, and is configured to produce beer from the wort for subsequent storage in a bright beer tank 28, when in use.

The brewing arrangement 10 also includes a monitoring and control system 30 which generally comprises a plurality of sensors 32 for sensing brewhouse and fermentation assembly operating characteristics, a plurality of actuators 34 configured to remotely control the brewhouse and fermentation assemblies 12 and 24 to influence these respective operating characteristics, and some manner of remote interface 100 for receiving the sensed operating characteristics and instructing the actuators 34. In such a manner, centralised wort production by the brewhouse assembly 12 and distributed beer production by the respective fermentation assemblies 24 are remotely manageable.

It is to be appreciated that fermentation occurs remotely from the brewhouse assembly 12 at the respective fermentation assemblies 24. As such, the skilled addressee will appreciate that no production of alcohol is generally performed by the brewhouse assembly 12, which typically does not require a liquor license for the production of alcohol. Instead, fermentation and associated alcohol production typically occur at each respective fermentation assembly 24, which would require a liquor license where appropriate.

The skilled addressee will further appreciate that various configurations of the mash tun 14, kettle 16, filter 18 and chiller 20 are possible, as is well-known in the art of brewing. For this reason, the specifics of these components are not described in any details. For example, the filter 18 may form part of the mash tun 14, where a grain bed acts as an operative filter element, or the like. Additionally, the filter 18 may comprise a hopback or a whirlpool. Similarly, in one example the wort chiller 20 typically comprises a heat exchanger, or the like.

The sensors 32 of the monitoring and control system generally comprise sensors for sensing brewhouse and fermentation assembly operating characteristics selected from a list consisting of fluid pressure, fluid temperature, fluid flow rate, and fluid density. A variety of such sensors is known in the art and will not be described in any detail.

Similarly, the actuators 34 of the monitoring and control system 30 generally comprise actuators for controlling such brewhouse and fermentation assembly operating characteristics of fluid pressure, fluid temperature, fluid flow rate, and fluid density. To this effect, the actuators 34 may comprise pumps, heating elements, valves, etc., numerous examples of which are known in the art.

Typically, the remote interface 100 comprises a processing system or similar computer terminal arranged in signal communication with the brewhouse and fermentation assemblies 12 and 24 by means of a communications network or system 200. To this end, with reference to FIGS. 2 and 3, general examples of a suitable processing system 100 and communications network or system 200 are provided that can be used to implement the monitoring and control system 30, as will be understood by the skilled addressee.

It is to be appreciated that any reference herein to "means" specifically includes any one or more of a computer program product for use in a local or dispersed computing system, a computer readable modulated carrier signal for interpretation by a local or dispersed computing system, or a computer readable medium of instructions for enabling a local or dispersed computing system to provide such "means" within the context of the description. In addition, such "means" may further expressly comprise any of the hardware and/or software components, independently or in combination, provided for in the description below, as will be understood by the skilled addressee.

In general terms, in a networked information or data communications system 200, a user has access to one or more terminals which are capable of requesting and/or receiving information or data from local or remote information sources. In such a communications system 200, a terminal 100 may be a type of processing system, computer or computerised device, personal computer (PC), mobile, cellular or satellite telephone, mobile data terminal, portable computer, Personal Digital Assistant (PDA), pager, thin client, or any other similar type of digital electronic device.

The capability of such a terminal 100 to request and/or receive information or data can be provided by software, hardware and/or firmware. A terminal 100 may include or be associated with other devices, for example a local data storage device such as a hard disk drive or solid-state drive.

An information source can include a server, or any type of terminal, that may be associated with one or more storage devices that are able to store information or data, for example in one or more databases residing on a storage device. The exchange of information (i.e., the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

The network infrastructure can include devices such as a telephone switch, base station, bridge, router, or any other such specialised network component, which facilitates the connection between a terminal and an information source. Collectively, an interconnected group of terminals, communication means, infrastructure and information sources is referred to as a network.

The network itself may take a variety of forms. For example, it may be a computer network, telecommunications network, data communications network, Local Area Network (LAN), Wide Area Network (WAN), wireless network, Internetwork, Intranetwork, the Internet and developments thereof, transient or temporary networks, combinations of the above or any other type of network providing for communication between computerised, electronic or digital devices.

More than one distinct network can be provided, for example a private and a public network. A network as referenced in this specification should be taken to include any type of terminal or other similar type of electronic device, or part thereof, which is rendered such that it is capable of communicating with at least one other terminal.

Figure 2:
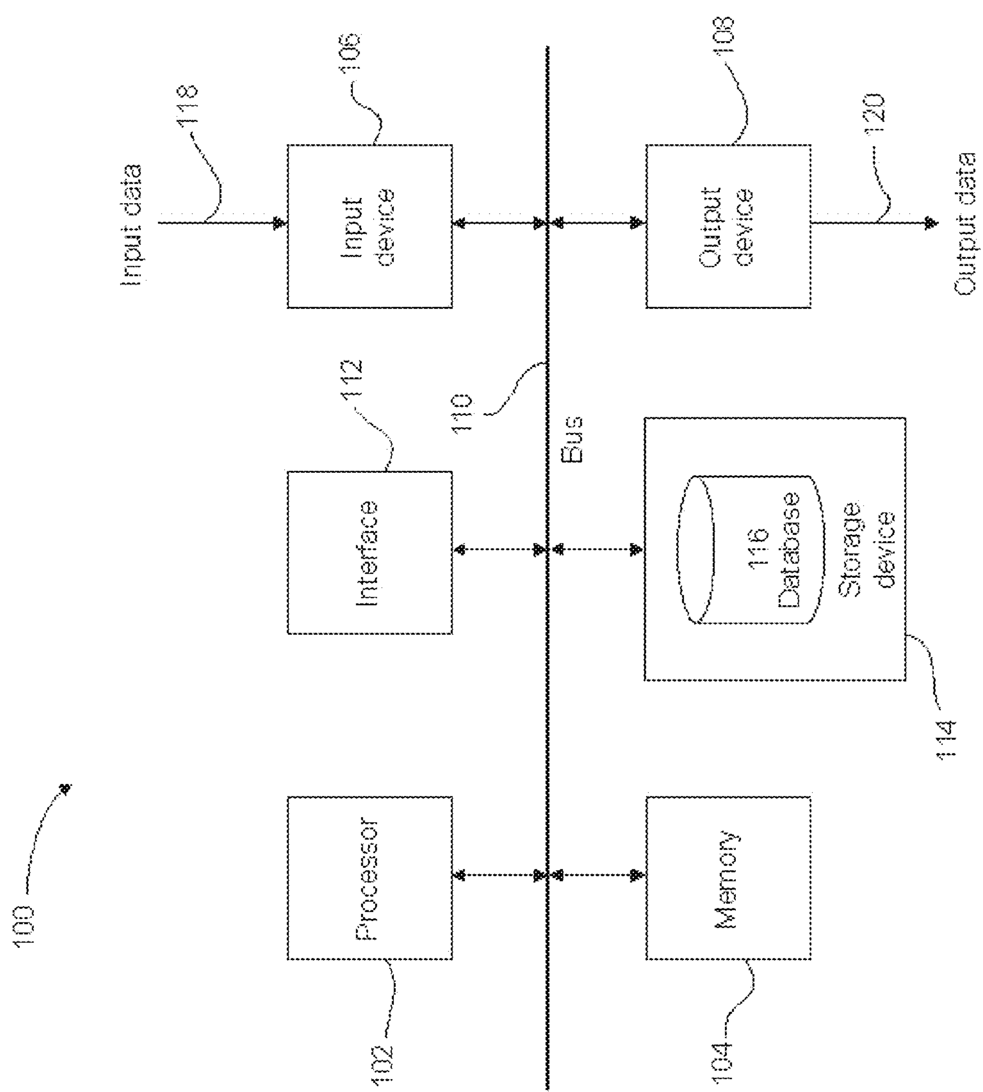
FIG. 2 illustrates a functional block diagram of an example processing system that can be utilised to embody or give effect to a particular embodiment of the brewing arrangement of FIG. 1.

A particular embodiment of the monitoring and control system 30 of the present invention can be realised using the example processing system 100 shown in FIG. 2. In particular, the processing system 100 generally includes at least one processor 102, or processing unit or plurality of processors, memory 104, at least one input device 106 and at least one output device 108, coupled together via a bus or group of buses 110.

In certain embodiments, input device 106 and output device 108 could be the same device, e.g. a touchscreen. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100.

Input device 106 receives input data 118 and can include, for example, a keyboard, a pointer device such as a pen-like device or a mouse, audio receiving device for voice-controlled activation such as a microphone, data receiver or antenna such as a modem or wireless data adaptor, data acquisition card, a touchscreen for receiving tactile input, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network.

A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, specialised hardware, or the like.

Figure 3:
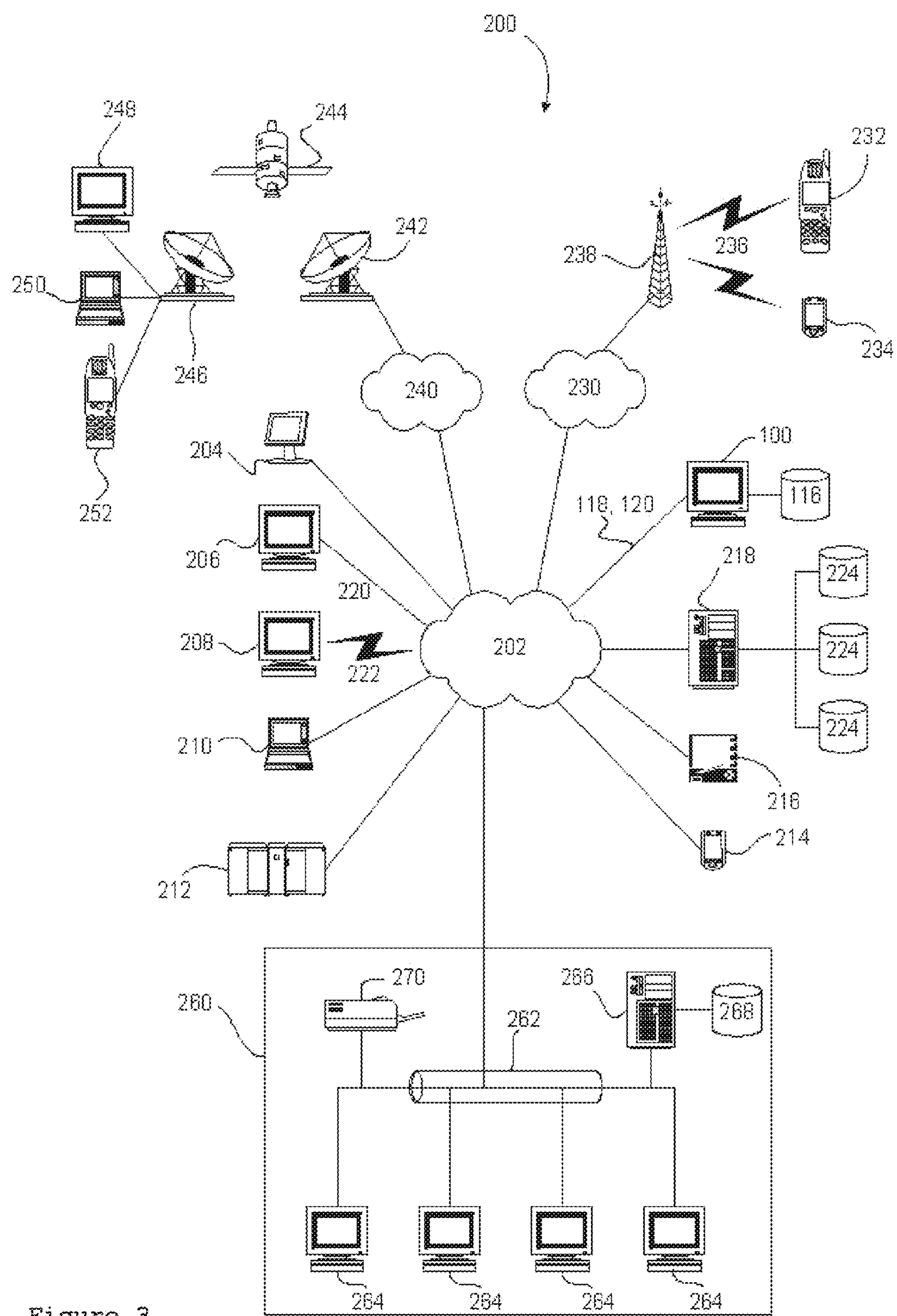
FIG. 3 illustrates an example network infrastructure that can be utilised to embody or give effect to a particular embodiment of a communications network whereby transactions can be performed.

In addition, the processing system 100 is generally part of a communications network or system 200, as shown in FIG. 3. Processing system 100 could connect to network 202, for example the Internet or a WAN. Input data 118 and output data 120 could be communicated to other devices via network 202. Other terminals, for example, thin client 204, further processing systems 206 and 208, notebook computer 210, mainframe computer 212, PDA 214, pen-based computer 216, server 218, etc., can be connected to network 202. A large variety of other types of terminals or configurations could be utilised.

The transfer of information and/or data over network 202 can be achieved using wired communications means 220 or wireless communications means 222. Server 218 can facilitate the transfer of data between network 202 and one or more databases 224. Server 218 and one or more databases 224 provide an example of one possible example of arrangement 10.

Other networks may communicate with network 202. For example, telecommunications network 230 could facilitate the transfer of data between network 202 and mobile or cellular telephone 232 or a PDA-type device 234, by utilising wireless communication means 236 and receiving/transmitting station 238. Satellite communications network 240 could communicate with satellite signal receiver 242 which receives data signals from satellite 244 which in turn is in remote communication with satellite signal transmitter 246.

Terminals, for example further processing system 248, notebook computer 250 or satellite telephone 252, can thereby communicate with network 202. A local network 260, which for example may be a private network, LAN, etc., may also be connected to network 202. For example, network 202 could be connected with Ethernet 262 which connects terminals 264, server 266 which controls the transfer of data to and/or from database 268, and printer 270. Various other types of networks could be utilised.

The processing system 100 is adapted to communicate with other terminals, for example further processing systems 206, 208, by sending and receiving data, 118, 120, to and from the network 202, thereby facilitating possible communication with other components of the networked communications system 200.

Thus, for example, the networks 202, 230, 240 may form part of, or be connected to, the Internet, in which case, the terminals 206, 212, 218, for example, may be web servers, Internet terminals or the like. The networks 202, 230, 240, 260 may be or form part of other communication networks, such as LAN, WAN, Ethernet, token ring, FDDI ring, star, etc., networks, or mobile telephone networks, such as GSM, CDMA or 3G, etc., networks, and may be wholly or partially wired, including for example optical fibre, or wireless networks, depending on a particular implementation.

Accordingly, in light of the above general description, the remote interface 100 of the brewing arrangement 10 may comprise a tablet computer configured for receiving the sensed operating characteristics of the brewhouse and fermentations assemblies 12 and 24, and for instructing the actuators 34 to influence such operating characteristics. In this manner, centralised wort production at the brewhouse assembly 12 and distributed beer production at the fermentations assemblies 24 are remotely manageable.

Other variations for facilitating communication between the respective components of the monitoring and control system 30 are possible and within the scope of the present invention. For example, in one embodiment, the remote interface 100 used for monitoring the brewhouse assembly 12 may not be connected to the communications network 200. In such an example, interface 100 may comprise a local Ethernet interface to a fixed Human-Machine Interface ('HMI') in a local control panel, along with a wireless replication of this HMI panel to a portable tablet device, e.g. via network 200, or the like. Similarly, the skilled addressee will appreciate that other variations are possible without detracting from the scope of the present disclosure.

In a manner described above, the arrangement 10 may facilitate centralised wort production and distributed beer production at a plurality of hospitality establishments, said wort and beer production remotely monitorable and controllable via a single remote interface, such as an Internet-capable tablet computer, a smartphone, or the like. In such an example, a master brewer can monitor and produce both wort and beer for a plurality of hospitality establishments in various locations remotely and at any time.

Typically, the remote interface comprises a suitably-configured Graphical User Interface (GUI) for remote display by the processing system 100, said GUI configured to provide a dashboard representing the brewhouse and fermentation assembly operating characteristics. The GUI dashboard typically provides an iconographical and interactive representation of the brewhouse and fermentation assembly operating characteristics. Typically, the GUI provides an iconographical and interactive representation of a plurality of hospitality establishments with fermentation assemblies.

The skilled addressee will appreciate that the GUI provides a pictorial or iconographic representation of the various components in a manner that allows ease of interpretation and control of the relevant operating characteristics.

In a preferred embodiment, the brewing arrangement 10 generally includes a mobile filtration and transfer rig 40 operatively and selectively dispatchable to a fermentation assembly 24, and which is configured to filter and transfer beer from a fermenter to a bright beer tank, said filtration and transfer rig 40 remotely monitorable and controllable by the monitoring and control system 30.

In one embodiment, the mobile filtration and transfer rig 40 comprises a pressurised filter housing and body, a transfer pump controlled by a variable speed drive, a calibrated magnetic flowmeter and calibrated temperature elements, wherein the speed of the transfer pump is adjustable via the variable speed drive to ensure optimum flow through the filter assembly during beer transfer. The calibrated magnetic flow meter and temperature sensor are used to accurately calculate the total volume transferred product, temperature controlled or corrected to 15.6° C., for purposes of custody transfer and calculation of alcohol excise payable. The mobile filtration and transfer rig 40 is generally brought back to the brewhouse assembly 12 once it has been used for cleaning, sanitation and redeployment to another establishment. The rig 40 typically includes a plurality of sensors and controls to facilitate high accuracy volume measurement of the transferred beer for custody transfer and alcohol excise purposes.

In a further embodiment, the brewing arrangement 10 generally includes a mobile and fully automated clean-in-place rig 42 that is operatively and selectively dispatchable to a fermentation assembly 24, and which is configured to clean and sanitise the fermentation assembly 24, said clean-in-place rig 42 monitorable and controllable by the monitoring and control system 30.

The clean-in-place rig 42 allows the automatic cleaning and waste recovery for a number of vessels (tanks and/or fermenters) simultaneously. The rig 42 generally has a plurality of sensors, pumps and valves that are controlled by the monitoring and control system 30 that allows the entire system to be remotely monitored and controlled from any location. The rig 42 may include a local touch screen interface that allows the operator to select the number of vessels to be cleaned, the size of the vessels to be cleaned, the type of cleaning chemicals to be used, the start-delay time for cleaning to commence and validates that all cleaning steps have been completed successfully upon completion of the automatic cycle. This local interface is mirrored in the remote interface 36 and remotely accessible to the operator so he does not have to attend the equipment during the cleaning cycle and can monitor & control all cleaning functions remotely. The clean-in-place rig 42 is generally brought back to the brewhouse assembly 12 once it has been used and is prepared for redeployment to another establishment. All waste and chemicals are also brought back to the brewhouse assembly 12 for disposal at a central waste disposal facility.

Figure 4:
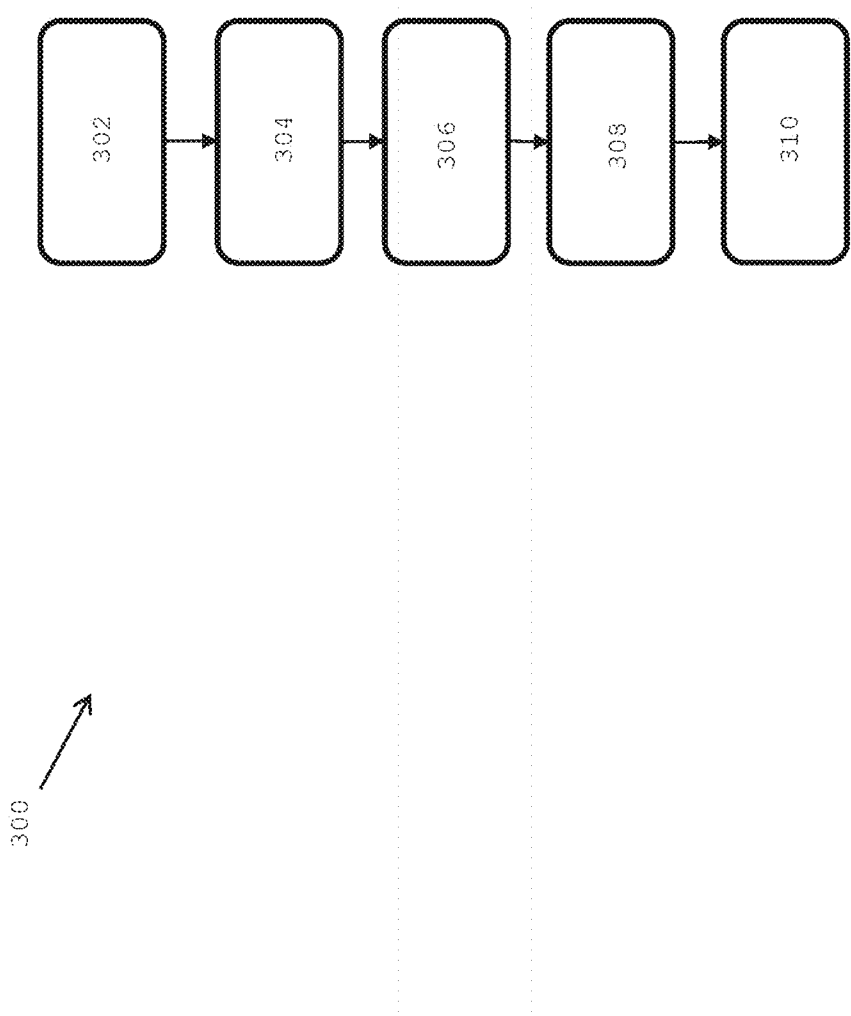
FIG. 4 is a diagrammatic representation of process steps representative of one example of a brewing method, in accordance with an aspect of the invention.

Referring now to FIG. 4 of the accompanying drawings, there is shown diagrammatic steps representative of a brewing method 300 associated with the above-described brewing arrangement 10.

Such brewing method steps 300 generally comprise producing wort 302 from mash liquor by means of the brewhouse assembly 12 and storing said wort in the transport container 22 shippable to a hospitality establishment or remote location and supplying 304 such shipped wort to a fermentation assembly 24 installed at the remote location. Method steps 300 further typically include continuously monitoring and controlling 306 the respective production of wort and beer by means of the monitoring and control system 30 having the plurality of sensors 32 and actuators 34 for sensing and controlling brewhouse and fermentation assembly operating characteristics.

In one example, the step of producing wort 302 includes preparing water and mixing same with grain in the mash tun 14 where enzymes react with starch in the grain to produce dissolved malt in the water or mash liquor, the grain having a coarse grind to facilitate the mash tun 14 using a process of mash fluidisation to enable transfer of mass and heat. Other methodologies are possible and within the scope of this invention.

In this example, the step of producing wort 302 includes recirculating the mash liquor through a grain bed formed in the mash tun 14 whilst pumping said liquor through external heaters (not shown) for temperature control. These external heaters are generally configured to maintain the temperature in the mash tun 14 and also to provide heat when the liquor temperature is ramped to a different temperature in order to enable different enzymes to produce a different malt profile from the grain. In such an example, at the time of temperature ramp, water at near boiling temperature is introduced to the recirculating mash liquor to enable quick temperature ramp steps.

Preferably, the step of producing wort 302 also includes enabling a mash stirrer (not shown) in the mash tun 14 three times during mash production, namely shortly after the mash is struck, shortly after a main mash rest begins, and midway through the main mash rest. Such a mash stirrer generally operates for a short period of time. In this manner, the grain bed is mixed to prevent the formation of dough balls but not disturbed to the point of causing pulverisation leading to a stuck mash.

In this example, the step of producing wort 302 includes transferring the sweet wort from the mash tun 14 to the kettle 16 under variable speed control to ensure optimum transfer rates to maximise grain bed extraction efficiency. Typically, this step of transferring the wort from the mash tun 14 to the kettle 16 includes sparging water at 78° C. to a top of the grain bed to wash out the liquefied malt from the grain bed. This step of managing any addition of spare water and the transfer to the kettle 16 is typically managed by mass balance calculations to ensure precise control to optimum conditions. The step of producing wort 302 generally includes controlling heat input to the kettle 16 to achieve a 10% boil-off whilst hops are added.

In one example, the method 300 may include the further step of, once the mash transfer is complete, emptying and cleaning the mash tun 14 in preparation for another charge of grain for another batch of wort whilst the current batch is in the kettle 16.

In the current example, the step of storing the wort 302 includes transferring the wort to the transport container 22 via the chiller or heat exchanger 20 and filter or hopback 18 whilst controlling a transfer rate thereof to ensure a constant temperature is maintained in the transport container 22.

In one example, the method 300 may include the step of shipping the transport container 22 to the remote location. Alternatively, the transport container 22 may be shipped to the remote location by a third party not involved in performing the method steps 300.

In one example, the method typically includes the step of adding yeast to the wort in the fermentation assembly 24 and/or the transport container 22. The step of monitoring and controlling the production of beer 306 generally includes monitoring and controlling temperature and pressure in the fermentation assembly 24 over a period of days while the yeasted wort converts into beer.

In one example, the step of monitoring and controlling the production of beer 306 includes, once the required fermentation is determined complete, initiating a chill process where the contents of the fermenter 26 of the fermentation assembly 24 is brought to 0° C. and maintained for some days.

Typically, the method 300 includes the step of, at the end of this chill period, dispatching 308 a mobile filtration rig 40 to the remote location whereby the beer is transferred and filtered from the fermenter 26 into a bright beer tank 28 of the fermentation assembly 24.

In a further example, the method 300 may include the step of, once the beer is transferred from the fermenter 26 to the bright beer tank 28, connecting the fermenter 26 to a mobile cleaning rig 42 configured to clean 310 the fermenter 26 with caustic and sanitising solution before pumping waste into a separate tank.

Further to the above general description of aspects of the invention, specific aspects of the arrangement 10 and method 300 will now be discussed in more detail.

In use, the brewhouse assembly 12 monitors all aspects of the brewing process from initial water filtration, blending and pre-treatment through the entire brewing process up to the stage of sweet wort production, heat recovery and waste water treatment and disposal. All signals are monitored by a programmable logic controller (PLC) which is interfaced to a remote interface 100 in the form of a Human Machine Interface (HMI), which allows an operator to monitor & control the entire brewhouse assembly 12. The HMI screen (s) are also transmitted (wirelessly or via the internet) to one (or more) tablet devices, allowing the operator to have full control of the brewhouse assembly 12 without having to be physically present at the site of the brewhouse assembly 12.

Control logic executing in the PLC consists of instructions, logic and algorithms that allow the operator to produce a very wide variety of product accurately and repeatably. The operator is able to monitor and control all critical production parameters or operating characteristics that effect the strength, type, taste, colour and flavour of the final product. The monitoring and control system 30 also allows the operator log/trend all critical parameters associated with a recipe (e.g. strike temperature, infusion ramping, mash transfer rate, wort cooling rate, kettle boil-off rate etc.).

To this end, examples of the sensors 32 and actuators 34 may include various different types. In the present example, all water tank levels are measured using sanitary pressure transmitters which measure water column in the tank and which is directly proportional to the volume of the contents in the tank. As an option, these level measurements could also be achieved using alternate technologies such as ultrasonic sensors, open or wire-guided radar, laser, and/or or other types of level measurement sensors.

Temperature measurements are made using PT100 RTD (resistance temperature detectors) elements either installed in thermowells or directly into the relevant tanks. The elements are connected to head mounted temperature transmitters which are monitored by the PLC. In other examples, thermocouple elements can be used in lieu of RTD elements. Flowrates are measured using sanitary magnetic flow meters, but ultrasonic flow meters etc. can also be used.

Actuator pumps are generally driven by 3 phase electrical motors and are controlled using variable frequency drives which control pump speed, start and stop according to a reference signal received from the PLC. Similarly, the heating of various process fluids can be achieved using gas burners or produced steam from a gas fired or oil-fired boiler, or the like.

Actuator control valves can be either ¼ turn ON/OFF sanitary butterfly valves, or ON/OFF angle valves. Each is controlled by a pneumatic actuator that will open and close the valve according to a signal from the PLC generally via a corresponding pneumatic solenoid valve mounted in the control cabinet. As an option, electrically actuated ON/OFF valve actuators could be used in lieu of the pneumatic valve actuators.

Cooling fluid for the heat exchangers is typically produced in a self-contained glycol chilling plant. The plant consists of a thermal reservoir of cooling fluid which is chilled to a selectable temperature and recirculated within the reservoir. When needed by the process, the PLC will control valves within a cooling pipe circuit to introduce cooling fluid to the heat exchangers. As an option, cooling fluid could be produced using ice addition to potable water and controlling the flow of that iced water into the heat exchangers.

Some of the sensed and controlled brewhouse assembly operating characteristics include brew water preparation signals, e.g. pure water production from a reverse osmosis and filtration plant, raw water production from the filtration plant, pure water storage tank level, raw water storage tank level, automatic mixing and dosing of water to produce desired feed water, and feed water tank levels.

Similarly, brewhouse assembly operating characteristics also includes wort production hot water signals, including heating and level control of a hot liquor tank 1 holding strike and infusion water, heating and level control of a hot liquor tank 2 holding thermal inertia water, level and temperature control of hot water recovered from the kettle 16 in a warm wash water tank, level and temperature control of the heat exchanger feed water tank, and the like.

Further brewhouse assembly operating characteristics may include sanitising hot water production signals, such as heating and level control of water in a sanitation tank, heating and level control of water in a recycle water tank, and the like. Mash production signals may include monitoring and control of strike water volume and temperature, monitoring and control of water addition, temperature ramping and rest duration during mash infusion steps, monitoring and control of mash liquor recirculation temperature, monitoring and control of mash liquor transfer temperature and flow rate during transfer of mash to kettle, and the like.

As will be appreciated by the skilled addressee, similar brewhouse assembly operating characteristics may include kettle control signals, wort transport vessel signals (including monitoring and control of oxygen injection into the wort transport vessel 22, where required), and clean-in-place system signals for mash tun sanitation, kettle sanitation, etc.

Similarly, each fermentation assembly 24 installed remotely from the brewhouse assembly 12 generally consists of one (or more) fermentation vessels or fermenters 26 and two (or more) beer conditioning and dispensing tanks, i.e. bright beer tanks 28 or BBTs). Each fermentation assembly 24 will also generally include a self-contained glycol chilling plant that will provide cooling fluid to control the temperature of the contents of both fermenter 26 and bright beer tanks 28, as well as a waste water collection tank.

A customer at each fermentation assembly 24 will generally dispense final product directly from the BBT 28 to a pouring tap. A beer dispensing pipework between the BBT's and the pouring tap typically uses a multi-stream pipe that is insulated and contain a chilling stream to ensure that the beer maintains the desired dispensing temperature when travelling between the BBT and the pouring tap. As such, each vessel of the fermentation assembly 24 (regardless of type) includes instrumentation, i.e. sensors 32 and actuators 34, to monitor, control and report the quantity and quality of the contents in each vessel.

In the current example, the fermenters 26 are operatively filled with wort produced in the brewhouse assembly 12 and with yeast to begin the fermentation process. As an option, yeast may be added to the wort transport vessel 22 prior to delivery to the remote location. The instrumentation on each fermenter 26 monitors and regulates the temperature of the fermentation process by means of controlling cooling fluid to the fermentation vessel cooling jacket. Each fermenter will also be fitted with instrumentation to monitor the density of the fermenting wort which will indicate the progress of the fermentation process.

The fermenters 26 are generally fitted with an emergency pressure and/or vacuum relief as well as a system to capture fermentation off-gasses. This system scrubs the off-gases via an activated carbon filter before evacuating the gasses to outside air. A carbon dioxide monitor and alarm will be fitted within the area where fermenters 26 are installed to ensure that any carbon dioxide leakage is detected and alarmed before the concentration reaches harmful levels.

All signals from the instrumentation fitted to the fermenters 26 and bright beer tanks 28 are monitored by a local PLC which has GPRS or WiFi/internet connectivity to a cloud-based monitoring system, as described in detail above. The cloud-based monitoring system allows the operator to remotely view, record and manually control (if needed) all aspects of the fermentation process in a fermenter 26.

Accordingly, some of the fermentation assembly operating characteristics may include fermentation vessel signals, such as monitoring and control of wort temperature at top and bottom of the fermentation vessel, monitoring of wort density in the fermentation vessel, control of cooling fluid flow to the fermentation vessel cooling jacket, reporting and logging of all measure signals, SMS text alerts based on pre-defined alarm conditions associated with the fermentation process, and the like.

Once fermentation is sensed as complete, the beer is transferred from the fermentation vessel or fermenter 26 to a bright beer tank 28. Spent yeast can be recovered from the fermenters and removed from site. Once the spent yeast is removed, the beer is typically pumped to the bright beer tank through filters.

As above, each BBT 28 is fitted with instrumentation to monitor the level/volume, pressure and temperature of the contents, and then regulate the temperature of the fermentation process by means of controlling cooling fluid to the fermentation vessel cooling jacket.

In one example, each BBT is calibrated by a certified laboratory to ensure accurate mapping of level measurement vs. volume for each BBT, as the amount of beer transferred to each BBT will form the basis for the amount of beer sold and must beer reported to the customer for taxation & excise reporting.

Applicant believes it particularly advantageous that the present invention provides for a brewing arrangement 10 and an associated brewing method 300 that facilitates in de-coupling several aspects of the traditional beer making process to allow a single brewery operator to produce a non-alcoholic beer precursor, i.e. wort, in a central production facility or brewhouse assembly. This wort can then be transported to a hospitality operator at a remote location, typically kilometres away, where the final fermentation and conditioning of the beer is completed, typically across multiple locations.

As such, a perceived advantage of the present invention is to reduce the traditional barriers to entry of establishing independent brew-pub operations and to enable a more space-effective, cost-effective, widely deployable craft beer experience without conventional issues of supply chain, logistics, energy, and waste disposal found with existing craft breweries or brew pubs, that has the potential to significantly improve the hospitality product to the market and continue to enable craft beer enjoyment more widely.

Importantly, alcohol production licensing can also be decoupled between the brewhouse assembly and the plurality of fermentation assemblies arranged in the hospitality establishments, which provides significant advantages, as the alcohol production occurs at the hospitality establishments rather than at the brewhouse assembly.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a", "an", "said", "the", and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

It is to be appreciated that reference to "one example" or "an example" of the invention, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter.

Accordingly, one example may exemplify certain aspects of the invention, whilst other aspects are exemplified in a different example. These examples are intended to assist the skilled person in performing the invention and are not intended to limit the overall scope of the invention in any way unless the context clearly indicates otherwise. Variations (e.g. modifications and/or enhancements) of one or more embodiments described herein might become apparent to those of ordinary skill in the art upon reading this application. The inventor(s) expects skilled artisans to employ such variations as appropriate, and the inventor(s) intends for the claimed subject matter to be practiced other than as specifically described herein.

Any method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A brewing arrangement comprising:

a brewhouse assembly having a mash tun, a kettle and a wort chiller arranged in fluid communication, said brewhouse assembly configured to operatively produce wort from mash liquor, said wort for subsequent storage in a transport container;

a plurality of fermentation assemblies arranged remotely from the brewhouse assembly in at least one hospitality establishment having a geographic distance of at least 1 km from the brewhouse assembly, in use, each fermentation assembly including at least one fermenter arranged in fluid communication with a plurality of bright beer tanks, said fermenter suppliable with wort from the transport container and configured to operatively produce beer for subsequent storage in a bright beer tank; and a monitoring and control system comprising:

i) a plurality of sensors for sensing respective brewhouse and fermentation assembly operating characteristics, ii) a plurality of actuators configured to remotely control the respective brewhouse and fermentation assemblies to influence such operating characteristics, and iii) a remote interface for receiving sensed operating characteristics and instructing the actuators, the remote interface comprising a processing system arranged in signal communication with the brewhouse and fermentation assemblies by means of a communications network or system, the remote interface configured to operatively provide a Graphical User Interface (GUI) for display by the processing system, said GUI configured to provide a dashboard representing iconographical and interactive brewhouse and fermentation assembly operating characteristics; and a mobile filtration and transfer rig operatively and selectively dispatchable to a fermentation assembly, said mobile filtration and transfer rig configured to filter and transfer beer from a fermenter to a bright beer tank and comprising a pressurised filter housing and body, a transfer pump controlled by a variable speed drive, a calibrated magnetic flowmeter and calibrated temperature elements, wherein the speed of the transfer pump is adjustable via the variable speed drive to ensure optimum flow through the filter assembly during beer transfer, said filtration and transfer rig remotely monitorable and controllable by the monitoring and control system;

whereby centralised wort production at the brewhouse assembly as well as distributed beer production at the plurality of hospitality establishments are remotely monitorable and controllable via the remote interface, and wherein each bright beer tank includes instrumentation for accurate reporting of beer volume transferred thereto to the monitoring and control system, so that produced beer volume is reportable via the GUI for taxation and excise reporting purposes.

2. The brewing arrangement of claim 1, wherein the brewhouse assembly comprises at least one filter.

3. The brewing arrangement of claim 2, wherein the filter forms part of the mash tun, where a grain bed in said mash tun acts as an operative filter element.

4. The brewing arrangement of claim 2, wherein the filter comprises a hopback or a whirlpool.

5. The brewing arrangement of claim 1, wherein the wort chiller comprises a heat exchanger.

6. The brewing arrangement of claim 1, wherein the brewhouse assembly comprises at least one hot liquor tank for storing hot liquor during wort production.

7. The brewing arrangement of claim 1, wherein the hospitality establishment has a geographic distance from the brewhouse assembly in a range of 1 km to 1000 kms.

8. The brewing arrangement of claim 1, wherein the sensors of the monitoring and control system comprise sensors for sensing brewhouse and fermentation assembly operating characteristics selected from a list consisting of fluid pressure, fluid temperature, fluid flow rate, and fluid density.

9. The brewing arrangement of claim 1, wherein the actuators of the monitoring and control system comprise actuators for controlling brewhouse and fermentation assembly operating characteristics selected from a list consisting of fluid pressure, fluid temperature, fluid flow rate, and fluid density.

10. The brewing arrangement of claim 1, wherein the actuators comprise pumps, heating elements, and valves.

11. The brewing arrangement of claim 1, wherein the GUI provides an iconographical and interactive representation of a plurality of hospitality establishments with fermentation assemblies.

12. The brewing arrangement of claim 1, which includes a mobile and fully automated clean-in-place rig that is operatively and selectively dispatchable to a fermentation assembly, and which is configured to clean and sanitise the fermentation assembly, said clean-in-place rig monitorable and controllable by the monitoring and control system.

* * * * *